United States Patent Office 3,509,153
Patented Apr. 28, 1970

3,509,153
5-PHENYL (OR 5-PHENYLALKYL)-2-[ω-(4-PHENYL-1-PIPERAZINYL)ALKYL]TETRAZOLES
Shin Hayao, Elkhart, and Wallace Glenn Strycker, Goshen, Ind., assignors to Miles Laboratories, Inc., Elkhart, Ind., a corporation of Indiana
No Drawing. Filed Mar. 24, 1967, Ser. No. 625,614
Int. Cl. C07d 55/56
U.S. Cl. 260—268          4 Claims

ABSTRACT OF THE DISCLOSURE

Tetrazole derivatives, generally 5-aryl (or aralkyl)-2-(ω-dialkylaminoalkyl)-2H-tetrazoles, having antihypertensive properties. Also, a process for the preparation of these compounds including the alkylation of a 5-aryl (or aralkyl)-2H-tetrazole with a suitable aminoalkyl halide.

This invention relates to tetrazole derivatives. More particularly the invention relates to novel 5-aryl (or aralkyl)-2-(ω-dialkylaminoalkyl)-2H-tetrazoles having desirable pharmacological properties.

The compounds of this invention are represented by means of the structural formula

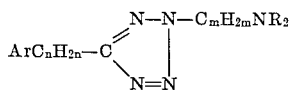

In the above structural formula Ar represents phenyl, substituted phenyl, wherein the substituents are selected from the group consisting of halogen, lower alkyl, lower alkoxy, and hydroxy, and heterocyclic radicals derived from the group consisting of pyridine, thiophene, pyrimidine, thiazole, indole and furan, with $n$ equal to between about 0 and 2. In the case of the lower alkyl or alkoxy radicals the chain length is advantageously between about 1 and 4 carbon atoms. $NR_2$ represents dialkylamino, morpholinyl, 1-piperidyl, 4-methyl-1-piperazinyl, 4-aryl-1-piperazinyl, 4-aryl-1-piperidyl, or 4-hydroxy-4-phenyl-1-piperidyl and $m$ is an integer between about 1 and 5.

The compounds of this invention can be furnished in the form of various salts, for example, salts of mineral acids such as the hydrochloride. The tetrazole compounds of this invention can also be isolated as salts of various organic acids such as the oxalate or maleate. In general, salts which are pharmacologically acceptable are used.

These compounds are conveniently prepared by the alkylation of 5-aryl (or aralkyl)-2H-tetrazoles with a suitable aminoalkyl halide according to the general reaction sequence:

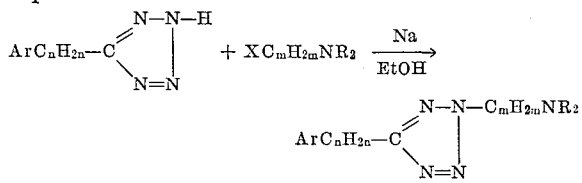

In this general reaction sequence Ar, $n$, $NR_2$ and $m$ correspond respectively with their previous descriptions. X represents the halogen of the aminoalkyl halide and is preferably chlorine.

A suitable catalyst is used in carrying out the reaction. Advantageously this is a basic catalyst, such as a basic alkoxide, and preferably sodium ethoxide, as shown in the general reaction sequence.

Although the reaction conditions are not considered critical, the solution is preferably maintained under reflux with stirring for a period of time sufficient to allow the reaction to go to completion, for example, between about 8 and 20 hours.

The novel 5-aryl (or aralkyl)-2-(ω-dialkylaminoalkyl)-2H-tetrazoles of this invention are useful as anti-hypertensive agents and can be formulated in unit dosage form for oral administration in accordance with accepted pharmaceutical principles.

The invention will be better understood by reference to the following examples.

EXAMPLE 1

5-phenyl-2-[3-(4-phenyl-1-piperazinyl)propyl] tetrazole maleate 5-phenyltetrazole (16.3 g., 0.111 mole) was added to a solution of sodium (2.57 g., 0.111 mole) in 350 ml. of anhydrous ethanol and the solution was heated under reflux for about 30 minutes. 4-phenyl-1-(3-chloropropyl)piperazine (26.6 g., 0.111 mole) was added to the above solution and the resulting solution heated under reflux with stirring for about 18 hours. The solvent was removed in vacuo and the concentrate was suspended in water. The free base was extracted with chloroform. The extracts were concentrated in vacuo to an oil. This free base was dissolved in hot methanol and an aqueous-methanolic solution of maleic acid (13 g., 0.112 mole) was added. The solution was filtered and cooled to form a crystalline salt. The salt was collected and recrystallized from aqueous methanol to form a solid of M.P. 163–164° C. (dec.), yield 37 g.

Analysis.—Calcd. for $C_{20}H_{24}N_6 \cdot C_4H_4O_4$ (percent): C, 62.1; H, 6.03; N, 18.0. Found (percent): C, 62.1; H, 5.85; N, 18.2

EXAMPLE 2

5-phenyl-2-[3-(4-phenyl-1-piperidyl)propyl] tetrazole maleate 5-phenyltetrazole (14.6 g., 0.12 mole) was added to a solution of sodium (2.3 g., 0.1 mole) in 350 ml. of anhydrous ethanol and the solution was heated under reflux for about 30 minutes. 4-phenyl-1-(3-chloropropyl)piperidine (23.7 g., 0.1 mole) was added and the solution was heated under reflux with stirring for about 20 hours. The solvent was removed in vacuo and the concentrate suspended in water. The free base was extracted with chloroform. The extracts were concentrated in vacuo to an oil. The oil was dissolved in hot methanol and a methanol solution of maleic acid (12.7 g., 0.11 mole) and a small amount of water were added. The solution was filtered and the filtrate was cooled to form a crystalline salt. The salt was collected and recrystallized from aqueous methanol to form a solid of M.P. 162.5–163.5° C. (dec.), yield 27.9 g.

Analysis.—Calcd. for $C_{21}H_{25}N_5 \cdot C_4H_4O_4$ (percent): C, 64.8; H, 6.26; N, 15.1. Found (percent): C, 64.9; H, 6.39; N, 15.2.

EXAMPLE 3

5-phenyl-2-(3-morpholinopropyl)tetrazole maleate 5-phenyltetrazole (16.1 g., 0.11 mole) was added to a solution of sodium (2.5 g., 0.11 mole) in 350 ml. of anhydrous ethanol and the solution heated under reflux for about 30 minutes. N-(3-chloropropyl)morpholine (18.0 g., 0.11 mole) was added and the solution was heated under reflux with stirring for 18 hours. The solvent was removed in vacuo and the concentrate was suspended in water. The free base was extracted with chloroform. The dried extracts were concentrated in vacuo to an oil. The oil was dissolved in hot methanol and a methanol solution of maleic acid (14 g., 0.12 mole) was added. The hot solution was filtered and cooled to form a crystalline salt. The solid was collected and twice recrystallized from methanol to give a salt of M.P. 143–144.5° C. (dec.), yield 20 g.

Analysis.—Calcd. for $C_{14}H_{19}N_5O \cdot C_4H_4O_4$ (percent): C, 55.5; H, 5.91; N, 18.0. Found (percent): C, 55.6; H, 5.89; N, 17.9.

EXAMPLE 4

5-benzyl-2-[3-(4-phenyl-1-piperazinyl)propyl] tetrazole dihydrochloride 5-benzyltetrazole (16 g., 0.1 mole) was added to a solution of sodium (2.3 g., 0.1 mole) in 300 ml. of anhydrous ethanol and the solution was heated under reflux for about 30 minutes. 4-phenyl-1-(3-chloropropyl)piperazine (23.8 g., 0.1 mole) was added and the solution was heated under reflux with stirring for 8 hours. The solvent was removed in vacuo and the concentrate was suspended in water. The free base was extracted with chloroform. The dried extracts were concentrated in vacuo, redissolved in 2-propanol and saturated with dry HCl to form a solid. The solid was redissolved by addition of water, filtered and the filtrate was diluted with ethyl acetate. The resulting solid was recrystallized from an aqueous 2-propanol-ether solution and again from ethanol to form a solid of M.P. 198–199.5° C. (dec.), yield 13 g.

Analysis.—Calcd. for $C_{21}H_{26}N_6 \cdot 2HCl$ (percent): C, 57.93; H, 6.44; N, 19.31; HCl, 16.78. Found (percent): C, 57.99; H, 6.39; N, 1943; HCl, 16.87.

EXAMPLE 5

5-benzyl-2-[3-(4-phenyl-1-piperidyl)propyl] tetrazole oxalate 5-benzyltetrazole (16 g., 0.1 mole) was added to a solution of sodium (2.3 g., 0.1 mole) in 300 ml. of anhydrous ethanol and the solution was heated under reflux for about 30 minutes. 4-phenyl-1-(3-chloropropyl)piperidine (23.7 g., 0.1 mole) was added and the solution was heated under reflux for 8 hours. The solvent was removed in vacuo and the concentrate was suspended in water. The free base was extracted with chloroform. The extracts were concentrated in vacuo to an oil. The oil was dissolved in hot methanol and a methanol solution of oxalic acid (9 g., 0.1 mole) was added. The hot solution was filtered and cooled. The solid that formed was collected and recrystallized from an aqueous ethanol solution. Yield 24.5 g. M.P. 158–161° C. (dec.) softens ca. 140°.

Analysis.—Calcd. for $C_{22}H_{27}N_5 \cdot C_2H_2O_4$ (percent): C, 63.86; H, 6.43; N, 15.52. Found (percent): C. 63.94; H, 6.47; N, 15.43.

EXAMPLE 6

2-[3-(4-phenyl-1-piperazinyl)]-5-β-phenethyl-tetrazole dihydrochloride

5-β-phenethyltetrazole (16.1 g., 0.068 mole) was added to a solution of sodium (1.6 g., 0.068 mole) in 200 ml. of anhydrous ethanol and the solution was heated under reflux for about 30 minutes. 4-phenyl-1-(3-chloropropyl) piperazine (16.2 g., 0.068 mole) was added and the solution was heated under reflux with stirring for 20 hours. The solvent was removed in vacuo and the concentrate was suspended in water. The free base was extracted with chloroform. The dried extracts were concentrated in vacuo to an oil. The oil was dissolved in 2-propanol-ethyl acetate and a 2-propanol solution containing 14 g. of dry HCl was added. This solution was cooled and the solid that formed was collected and recrystallized, once from an aqueous methanol-solution and once from a methanol-ether solution. Yield 12.2 g. M.P. 209–211° C. (dec.).

Analysis.—Calcd. for $C_{22}H_{28}N_6 \cdot 2HCl$ (percent): C, 58.8; H, 6.68; N, 18.7. Found (percent): C, 58.2; H, 6.69; N, 18.6.

EXAMPLE 7

5-(3-pyridyl)-2-[3-(4-phenyl-1-piperidyl) propyl]tetrazole maleate 5-(3-pyridyl) tetrazole (19.1 g., 0.13 mole) was added to a solution of sodium (3 g., 0.13 mole) in 300 ml. of anhydrous ethanol and the solution was heated under reflux for about 30 minutes. 4-phenyl-1-(3-chloropropyl)piperidine (30 g., 0.13 mole) was added and the solution was heated under reflux with stirring for 20 hours. The mixture was filtered and the filtrate was concentrated in vacuo to dryness. The concentrate was suspended in water and the free base was extracted with chloroform. The dried extracts were concentrated in vacuo, the residue was dissolved in methanol and a methanol solution of maleic acid (30 g., 0.26 mole) was added. The solution was filtered and the filtrate was diluted with ether and cooled. The solid that formed was collected and recrystallized from an aqueous ethanol solution and twice recrystallized from a methanol-ether solution to give pale yellow crystals, M.P. 200.5–202.0° C. (dec.), yield 15.5 g.

Analysis.—Calcd. for $C_{20}H_{24}N_6 \cdot C_4H_4O_4$ (percent): C, 62.1; H, 6.03; N, 18.1. Found (percent): C, 62.1; H, 6.07; N, 18.0.

The foregoing description and examples illustrate some of the novel compounds that may be prepared in accordance with this invention

What is claimed is:

1. A compound selected from the group consisting of compounds of the formula

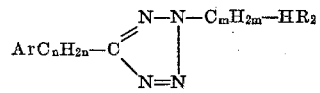

in which Ar is phenyl, $n$ is an integer of from 0 to 2, $NR_2$ is 4-phenyl-1-piperazinyl, and $m$ is an integer of from 1 to 5, and salts of said compounds with pharmacologically acceptable anions.

2. A compound of claim 1 which is 5-phenyl-2-[3-(4-phenyl-1-piperazinyl)propyl]tetrazole.

3. A compound of claim 1 which is 5-benzyl-2-[3-(4-phenyl-1-piperazinyl)propyl]tetrazole.

4. A compound of claim 1 which is 2-[3-(4-phenyl-1-piperazinyl)propyl]-5-β-phenethyltetrazole.

References Cited

UNITED STATES PATENTS 2,852,515   9/1958   Elpern _____ 260—308.4

ALEX MAZEL, Primary Examiner

A. M. T. TIGHE, Assistant Examiner

U.S. Cl. X.R.

260—247.2, 247.5, 256.4, 293, 294, 294.7, 296, 302, 308, 999